(12) United States Patent
Ajanovic et al.

(10) Patent No.: US 6,636,912 B2
(45) Date of Patent: *Oct. 21, 2003

(54) METHOD AND APPARATUS FOR MODE SELECTION IN A COMPUTER SYSTEM

(75) Inventors: Jasmin Ajanovic, Portland, OR (US); David J. Harriman, Sacramento, CA (US); David I. Poisner, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/414,974

(22) Filed: Oct. 7, 1999

(65) Prior Publication Data

US 2003/0182591 A1 Sep. 25, 2003

(51) Int. Cl.⁷ .............................................. G06F 13/10
(52) U.S. Cl. ...................... 710/105; 710/103; 710/36; 710/58
(58) Field of Search ........................ 375/222; 709/228, 709/233; 370/465; 715/400, 501; 710/314, 106, 105–107, 129, 36, 58

(56) References Cited

U.S. PATENT DOCUMENTS

| | | | | |
|---|---|---|---|---|
| 4,727,536 A | * | 2/1988 | Reeves et al. | 370/468 |
| 5,191,649 A | * | 3/1993 | Cadambi et al. | 709/225 |
| 5,386,544 A | * | 1/1995 | Nakamura | 714/15 |
| 5,469,435 A | * | 11/1995 | Krein et al. | 370/462 |
| 5,586,117 A | * | 12/1996 | Edem et al. | 370/447 |
| 5,590,292 A | * | 12/1996 | Wooten et al. | 710/5 |
| 5,621,894 A | * | 4/1997 | Menezes et al. | 358/406 |
| 5,621,897 A | * | 4/1997 | Boury et al. | 710/116 |
| 5,675,813 A | * | 10/1997 | Holmdahl | 713/310 |
| 5,883,894 A | * | 3/1999 | Patel et al. | 370/438 |
| 5,918,025 A | * | 6/1999 | Hayek et al. | 710/107 |
| 5,922,052 A | * | 7/1999 | Heaton | 709/223 |
| 5,923,663 A | * | 7/1999 | Bontemps et al. | 370/445 |
| 5,930,485 A | * | 7/1999 | Kelly | 710/112 |
| 5,933,612 A | * | 8/1999 | Kelly et al. | 710/311 |
| 5,938,728 A | * | 8/1999 | Dwork et al. | 709/222 |
| 5,944,805 A | * | 8/1999 | Ricks et al. | 710/107 |
| 5,978,874 A | * | 11/1999 | Singhal et al. | 710/107 |
| 5,991,303 A | * | 11/1999 | Mills | 370/402 |
| 5,991,824 A | * | 11/1999 | Strand et al. | 710/1 |
| 5,996,036 A | * | 11/1999 | Kelly | 710/110 |
| 6,012,118 A | * | 1/2000 | Jayakumar et al. | 710/107 |
| 6,021,456 A | * | 2/2000 | Herdeg et al. | 710/260 |
| 6,115,389 A | * | 9/2000 | Mahale et al. | 370/442 |
| 6,145,039 A | * | 11/2000 | Ajanovic et al. | 710/105 |
| 6,185,641 B1 | * | 2/2001 | Dunnihoo | 710/56 |
| 6,198,727 B1 | * | 3/2001 | Wakeley et al. | 370/247 |
| 6,215,793 B1 | * | 4/2001 | Gultekin et al. | 370/464 |
| 6,246,754 B1 | * | 6/2001 | Cole et al. | 379/93.29 |
| 6,301,628 B1 | * | 10/2001 | Janssens | 710/10 |
| 6,308,215 B1 | * | 10/2001 | Kolbet et al. | 326/21 |
| 6,374,317 B1 | * | 4/2002 | Ajanovic et al. | 710/105 |

OTHER PUBLICATIONS

Universal Serial Bus Specification Revision 1.1 Sep. 23, 1998.*

* cited by examiner

*Primary Examiner*—Paul R. Myers
(74) *Attorney, Agent, or Firm*—Blakely, Sokoloff, Taylor & Zafman LLP

(57) ABSTRACT

According to one embodiment, a computer comprises a central processing unit (CPU), a first hub agent, a first hub interface coupled to the first hub agent, and a second hub agent coupled to the first hub interface. The first and second hub agents operate at a first data clocking rate determined by exchanging data clocking rate capabilities.

22 Claims, 11 Drawing Sheets

METHOD AND APPARATUS FOR MODE SELECTION IN A COMPUTER SYSTEM

FIELD OF THE INVENTION

The present invention pertains to reducing average power consumption by a computer system. More particularly, the invention pertains to selecting between various modes of operation in a computer system having a hub interface architecture.

BACKGROUND OF THE INVENTION

Prior computer systems typically rely on standardized busses, such as the Peripheral Component Interconnect (PCI) bus adhering to a Specification Revision 2.1 bus developed by the PCI Special Interest Group of Portland Oregon, to allow computer system chipset components to communicate one with another. For example, a transaction originating at a processor and intended for a disk drive might first be delivered to a first chipset component that serves as an intermediary between the processor bus and a PCI bus. The first chipset component would then deliver the transaction over the PCI bus to a second system chipset component which would then deliver the transaction to the disk drive.

Busses such as the PCI bus also provide for communication with other computer system devices such as graphics controllers and network adapters. Because busses such as the PCI bus must interface with a variety of component types, each with varying requirements, the busses are not necessarily optimized for allowing communication between chipset components. Further, chipset manufacturers who rely on standardized busses such as the PCI bus must adhere to bus standards in order to ensure compatibility with other components, and are not at liberty to make substantial changes in how the chipset components communicate with each other.

Another issue that faces chipset component manufacturers in designing and manufacturing chipset components is the need to conform to standardized supply and signaling voltages when relying on busses such as PCI for communication between chipset components, thereby locking the manufacturers into certain design practices and manufacturing technologies. Therefore, it would be desirable to provide a flexible interface that provides optimal communication between chipset components. In addition, it would be desirable to provide a method and apparatus for selecting between various modes of operation in chipset components coupled to such an interface.

SUMMARY OF THE INVENTION

A method of selecting data clocking rates in a computer system is disclosed. According to one embodiment, the method includes detecting a reset signal indicating a power-on reset at a first device and a second device, exchanging the data clocking rate capabilities between the first and second devices via a first bus, and operating the first and second devices at a first data clocking rate. The first data clocking rate corresponds to the highest data clocking rate supported by the first and second devices

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
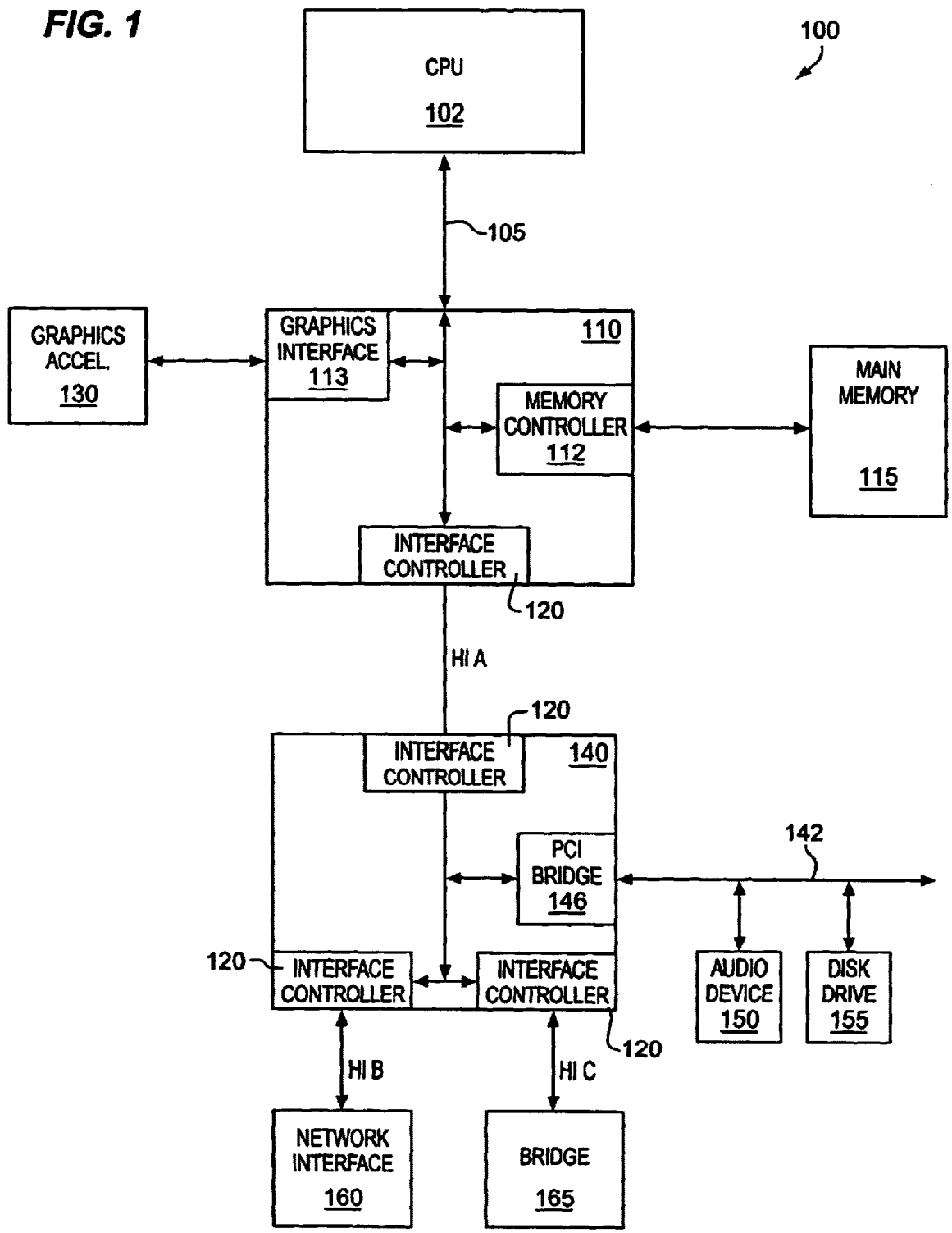
FIG. 1 is a block diagram of one embodiment of a computer system.

A method and apparatus for selecting between various modes of operation in a computer system having a hub interface architecture is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The programs including executable instructions may be executed by one or more programming devices (e.g., a central processing unit (CPU), processor, controller, etc.) in one or more personal computer systems, servers, workstations, etc.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family and Pentium® III processors available from Intel Corporation of Santa Clara, Calif. Alternatively, other CPUs may be used.

A memory control hub (MCH) 10 is also coupled to bus 105. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif. In addition, MCH 110 includes a hub interface controller 120. Interface controller 120 is used to couple MCH 110 to an input/output control hub (ICH) 140 via a hub interface B. ICH 140 provides an interface to input/output (I/O) devices within computer system 100. ICH 140 also includes a hub interface controller 120 that is used for coupling to MCH 110. ICH 140 may include one or more additional interface controllers 120. For example, an interface controller 120 may be coupled to a network interface 160 via hub interface B.

In addition, another interface controller 120 may be coupled to a bridge 165 via a hub interface C. Bridge 165 may provide an interface between ICH 140 and a system bus. In one embodiment, the system bus is an external PCI bus. However, one of ordinary skill in the art will appreciate hub interface controllers 120 may be coupled to other devices.

Devices coupled together via a hub interface may be referred to as hub interface agents. A hub interface agent that is positioned closer to CPU 102 on a hub interface in computer system 100 in terms of travel distance may be referred to as an upstream agent, while an agent that is further away from CPU 102 on the bus is referred to as a downstream agent. For example, for the MCH 110/ICH 140 hub interface, MCH 110 is the upstream agent on a hub interface A and ICH 140 is the downstream agent. ICH 140 may also include a PCI bridge 146 that provides an interface to a PCI bus 142. PCI bridge 146 provides a data path between CPU 102 and peripheral devices. Devices that may be coupled to PCI bus 142 include an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

Figure 2:
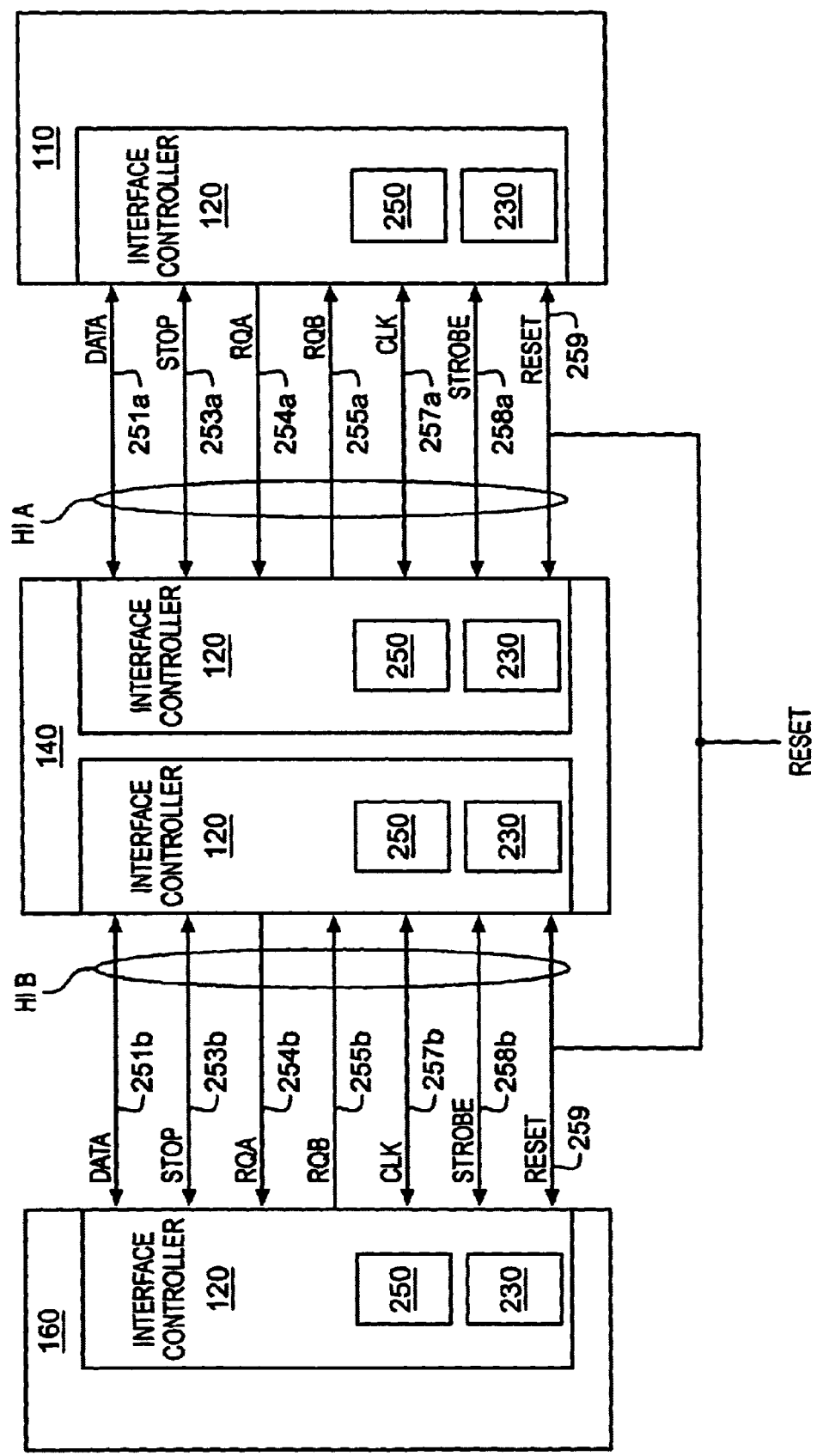
FIG. 2 is a block diagram of one embodiment of a memory control hub (MCH) and an input/output control hub (ICH) connected via a hub interface.

FIG. 2 is a block diagram of one embodiment of MCH 110 coupled to ICH 140 via hub interface A and ICH 140 coupled to network interface 160 via hub interface B. A hub interface is a mechanism for connecting main building blocks of the core logic of a computer system, such as computer system 100, via a relatively narrow and relatively high bandwidth data path. Between individual components in computer system 100, such as between MCH 110 and ICH 140, the connection is implemented in a point-to-point fashion. According to one embodiment, transfer of information across the hub interface bus is accomplished using a packet-based split-transaction protocol. More detail about hub interfaces is described below.

Hub interfaces A and B include a bi-directional data path 251, a stop signal 253, a request A (RQA) signal 254, a request B (RQB) signal 255, a clock (CLK) signal 257, data strobe (STROBE) signals 258 and hub interface reset signal 259. According to one embodiment, data path 251 is 8 bits wide. However, data path 251 may be any width that is a power of 2. Stop signal 243 is a bi-directional signal used for flow control. RQA signal 254 and RQB signal 255 are request signals that, during normal system operation, are asserted in order to request for control of the hub interface.

STROBE signals 258 are used to synchronize data into a hub agent while operating in a source synchronous mode. According to one embodiment, STROBE signals 258 may clock data at four times the frequency of the clock signal. Alternatively, STROBE signals 258 may operate at a multiple of the clock signal other than four. For example, STROBE signals 258 may run at a rate of eight times that of the clock signal 257. Hub interface reset signal 259 is used to reset agents at a hub interface. In one embodiment hub interface reset signal 259 may be an encoded signal that represents a type of reset that is to occur at the hub interface. For instance, hub interface reset signal 259 may indicate a standard computer system 100 reset, a power-on reset or a post power-on reset at hub interfaces within computer system 100.

As described above, hub interfaces A and B are coupled to agents via interface controllers 120 within each agent.

Interface controllers 120 control the interaction between the hub interface agents. According to one embodiment, hub interfaces support various modes of computer system 100 operation. For example, the hub interfaces may support a high performance mode or a low performance mode. In the high performance mode, data transactions within computer system 100 are performed at a data clocking rate that is a quadruple multiple of the external bus and CLK frequency (4× mode). The high performance mode may be the normal operating mode for applications in which computer system 100 is a desktop system.

Alternatively, computer system 100 may operate in the high performance mode in mobile applications where computer system 100 is placed in a docking station, or to support a high transfer rate of a high bandwidth device coupled to computer system 100, such as a hard drive or a video camera. The frequency multiplication necessary to achieve the 4× mode may be implemented by including an analog phase locked loop (PLL) circuit within each hub interface agent. Alternatively, a single PLL may provide 4× mode pulses to the various components within computer system 100. One of ordinary skill in the art will appreciate that other frequency multiplying devices, such as a digital PLL may be used for frequency multiplication.

In the low performance mode, data transactions within computer system 100 are performed at a data clocking rate that is a single multiple of the external bus and CLK frequency (1× mode). The low performance mode may be used for applications in which computer system 100 is a mobile system operated by battery power. While computer system 100 is operating in the low performance mode, the PLLs are deactivated. As a result, computer system 100 may be driven solely by the common system clock. Accordingly, battery life may be conserved while operating in the low performance mode. One of ordinary skill in the art will appreciate that other clock speeds may be used to implement the high power and low performance modes. Moreover, additional modes of operation may be included (e.g., a medium power mode).

According to one embodiment, mode selection in computer system 100 may be executed using an initial (or static) mode selection, a semi-dynamic mode selection, or a dynamic mode selection. For the initial mode selection, the data clocking rate at a hub interface is statically selected upon receiving a hub interface reset signal 259 indicating a hub interface power-on reset. According to one embodiment, the interface controllers 120 at the upstream and downstream agents of an interface include a capabilities exchange mechanism. The capabilities exchange mechanism permits each agent to communicate their mode capabilities to the other agent on the interface following a hub interface power-on reset. Accordingly, the two agents may exit a reset state and start operation in the optimum mode.

The capability exchange mechanism is implemented using control registers 230 and control logic 250 within interface controllers 120 of each agent. Control registers 230 store the highest mode of operation in which the particular agent supports. After a reset, control logic 250 within each agent initiates the transmission of the capabilities for the particular agent to the other agent on a hub interface via the bi-directional data path 251. In one embodiment, a logical one is transmitted from the upstream agent to the downstream agent via one or more bits of data path 251 if the highest mode the agent supports is the high performance mode. Otherwise, a logical zero is transmitted if the low performance mode is the highest mode supported.

Similarly, a logical one is transmitted from the downstream agent to the upstream agent via one or more other bits of data path 251 if the highest mode the agent supports is the high performance mode. Otherwise, a logical zero is transmitted if the low performance mode is the highest mode supported. Control logic 250 within each agent also compares its agent's capability with the highest mode capability of the other agent and determines the mode of operation for the particular interface. Upon exiting the reset state, operation of both the upstream and downstream agents commences operation at the hub interface using the highest mode supported by both.

Figure 3:
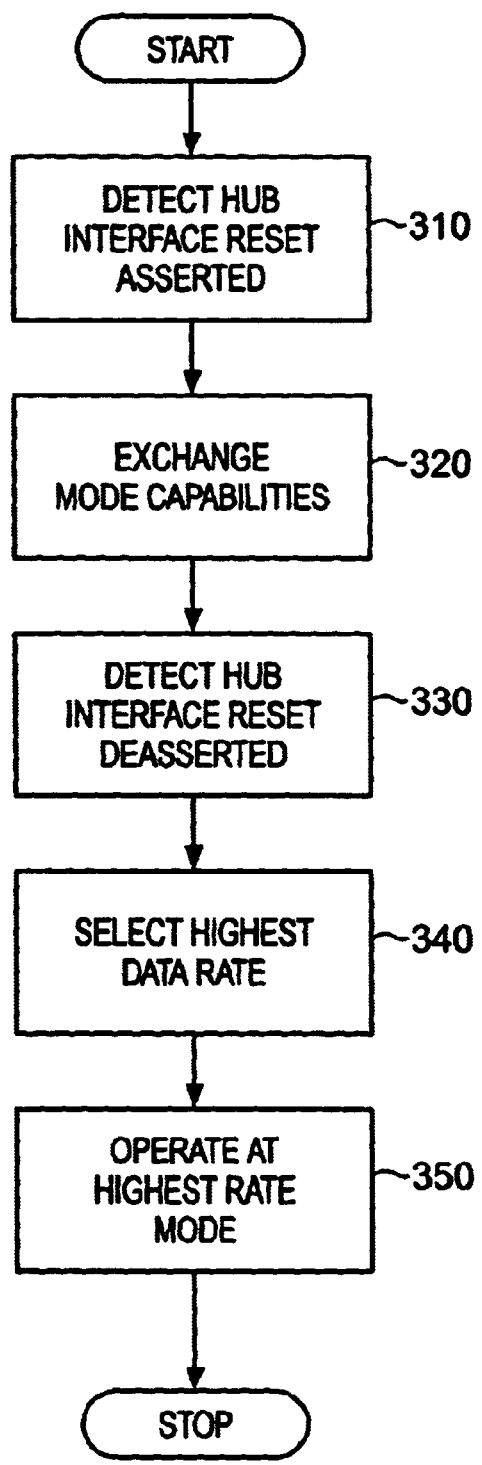
FIG. 3 is a flow diagram of one embodiment of an initial mode selection at a computer system.

FIG. 3 is a flow diagram of one embodiment of an initial mode selection at computer system 100. At process block 310, a hub interface reset signal 259 indicating a power-on reset is detected at the upstream and downstream agents of a hub interface interface. At process block 320, the mode capabilities of the upstream and downstream agents are exchanged in the manner described above. At process block 330, the hub interface reset signal 259 is removed. At process block 340, the highest data rate supported by the upstream and downstream agents is determined by the internal control logic. At process block 350, both agents commence operation at the highest determined data clocking rate.

The mode of operation may be modified after the initial mode selection by either the semi-dynamic or the dynamic selection process. It may be desirable to change modes of operation in applications where computer system 100 is portable and operating on battery power. In such an application, it may be necessary to transition to a lower clocking rate even though both the upstream and downstream agents are capable of operating at a higher clocking rate.

In order to implement semi-dynamic mode selection, a value indicating the preferred mode of operation may be programmed into the interface controller 120 control register of either the upstream or the downstream agent. In one embodiment, the programmed value is transmitted to the agent register after execution of the initial mode selection described above and before receiving a hub interface reset signal 259 indicating a post power-on reset.

Figure 4:
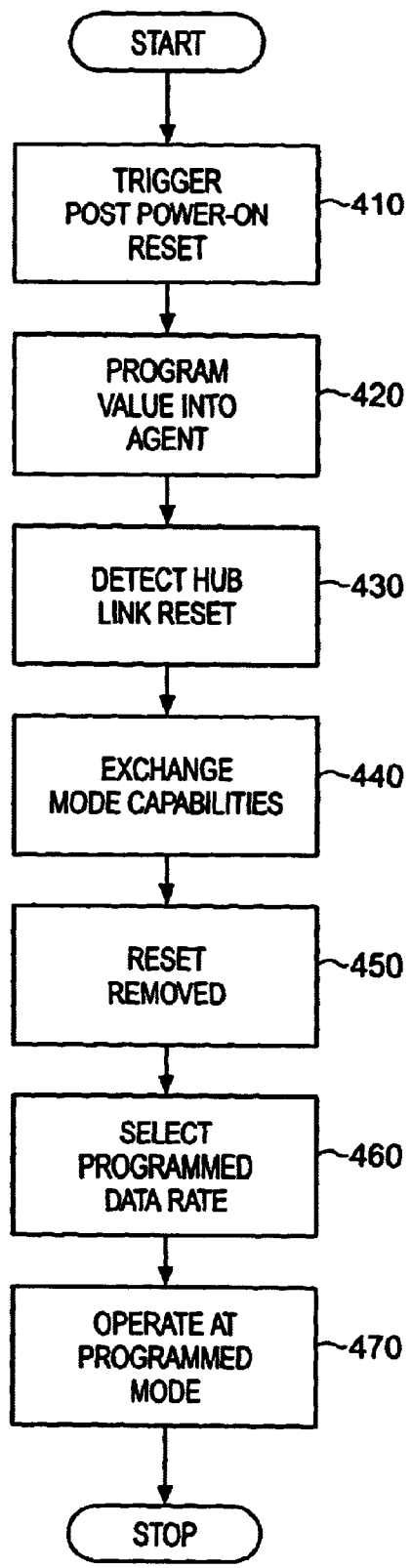
FIG. 4 is a flow diagram of one embodiment of a semi-dynamic mode selection at a computer system.

FIG. 4 is a flow diagram of one embodiment of semi-dynamic mode selection at computer system 100. At process block 410, a post power-on reset is triggered. According to one embodiment, post power-on reset is a signal that is activated within computer system 100 upon computer system 100 being placed in a docking station. At process block 420, a value indicating a preferred mode of operation is programmed into the control register of interface controller 120 within the upstream or the downstream agent of a hub interface. At process block 430, a hub interface reset signal 259 indicating a post power-on reset is detected at the upstream and downstream agents of a hub interface interface. Note that the agent that receives the program value must not reset the control register containing the value during the post power-on reset.

At process block 440, the agent that receives the program value transmits the value to the other agent via data path 251, while receiving the highest capable mode of operation from the other agent (e.g., capability exchange mechanism). At process block 450, the hub interface reset signal 259 is removed. At process block 460, the control logic in each agent determines that the interface will operate in the programmed mode. At process block 470, both agents commence operation at the programmed data clocking rate.

Figure 5:
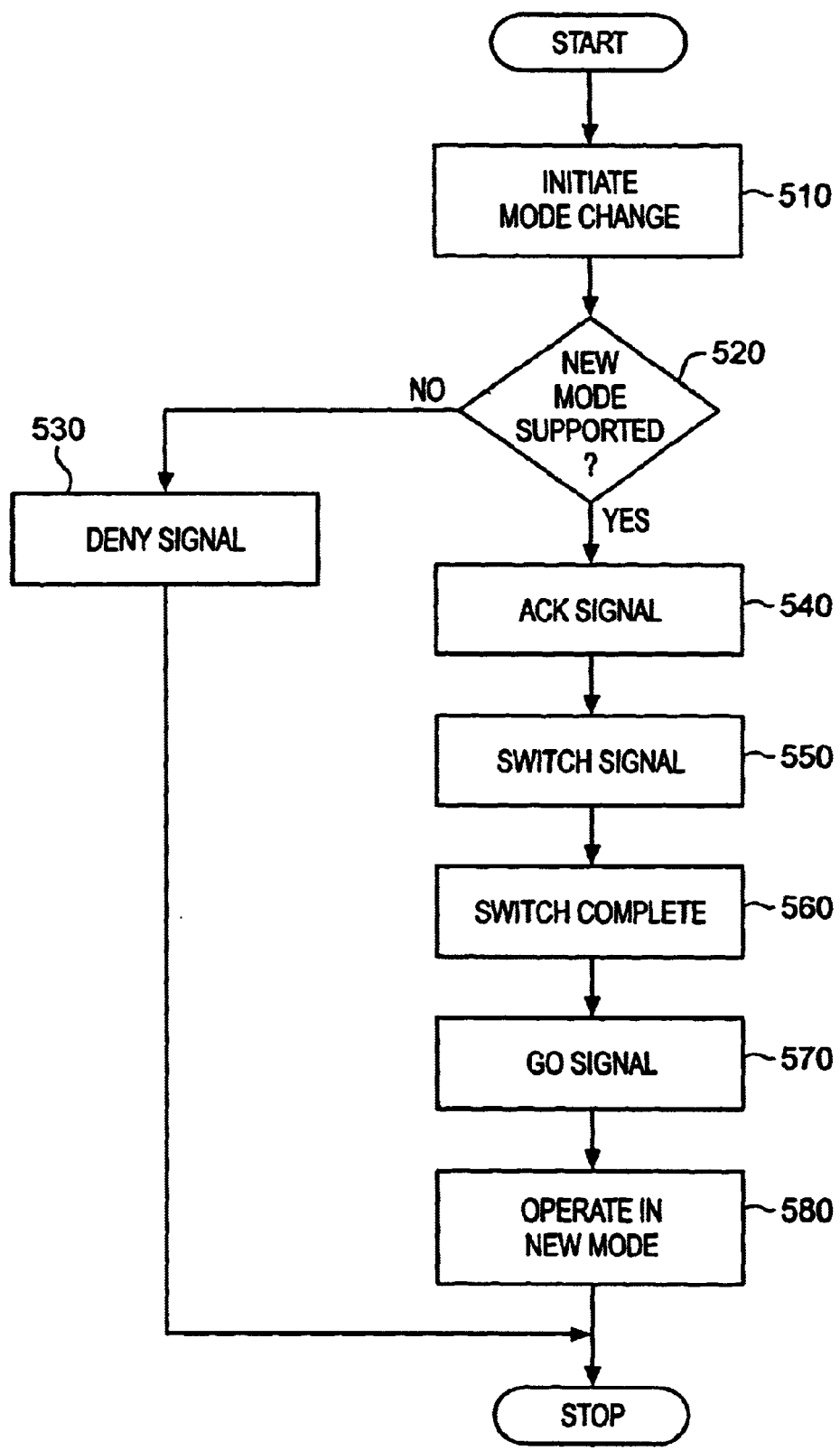
FIG. 5 is a flow diagram of one embodiment of a dynamic mode selection at a computer system.

FIG. 5 is a flow diagram of one embodiment of dynamic mode selection at computer system 100. At process block 510, a change to a new mode is initiated. According to one embodiment, the change to the new mode is initiated and controlled at the upstream agent of a hub interface interface, provided the upstream agent supports more than one mode. For example, MCH 110 controls the new mode change at the MCH 110/ICH 140 interface. A change to a new mode may be triggered by some event in computer system 100. For instance, in applications where computer system 100 is portable, a change from the low performance mode to the high performance mode may be activated upon computer system 100 being placed in a docking station (i.e., a transition from battery power to an alternating current (AC) power source). Further, a change from the high performance mode to the low performance mode may be activated upon computer system 100 being removed from the docking station.

Upon initiating a change to a new mode, the upstream agent transmits a mode change request to the downstream agent. However, operation at the hub interface continues in the current mode. At process block 520, it is determined whether the downstream agent on the interface supports the new mode. As described above, computer system 100 may include agents that do not implement all possible clocking rates. Therefore, if it is determined that a downstream agent does not support the new mode initiated by the upstream agent, the downstream agent transmits a signal to the upstream agent denying the change, process block 530. Accordingly, the hub interface continues to operate in the current mode.

If it is determined that the downstream agent does support the new mode initiated by the upstream agent, the downstream agent transmits a signal acknowledging the request to change, process block 540. In addition, downstream agents that include multiple hub interface interfaces may have the capability of supporting the new mode at the upstream interface, while one or more agents at the downstream interfaces may not be capable of operating in the new mode. Referring to FIG. 2 as an example, MCH 110 and ICH 140 may be capable of operating in the high performance mode over hub interface A, while ICH 140 may not support the new mode over hub interface B coupled to network interface 160. If ICH 140 supports interfaces that operate at different clocking rates, ICH 140 transmits the acknowledge signal for the mode change (e.g., process block 540). However, if ICH 140 does not support multiple interfaces that operate in different modes, the denying signal is transmitted from the downstream agent to the upstream agent (e.g., process block 530).

Once the upstream agent receives the acknowledge signal from the downstream agent, the upstream agent is assured that that all downstream agents that support the new mode are ready to switch to the new mode. Upon receiving the acknowledge signal, the upstream agent transmits a signal to the downstream agent to switch to the new mode, process block 550. The switch signal is transmitted using the current mode. At process block 560, the downstream agent transmits a signal to the upstream agent indicating that the switch to the new mode has been completed.

Once the downstream agent transmits the switch complete signal to the upstream agent, the downstream agent will not make any upstream transmissions on the hub interface until receiving further indication from the upstream agent. At process block 570, the upstream agent transmits a "GO" signal to the downstream agent. The "GO" signal is transmitted to the downstream agent at the new clocking rate. At process block 580, both the upstream and downstream agents are operating at the new mode over the hub interface.

One of ordinary skill in the art will appreciate that computer system 100 may include interfaces that change modes independent of one another. For example, hub interface A between MCH 110 and ICH 140 may switch modes without interfaces C and D switching modes. Further, one of ordinary skill in the art will recognize that the mode selection mechanism described above may be used in other applications such as enhanced request semantics.

Referring back to FIG. 2, the hub agents provide a central connection between two or more separate buses and/or other types of communication lines. By using the hub interface to interconnect the MCH 110 and the ICH 140, improved access is provided between I/O components and the CPU/memory subsystem (e.g., increased bandwidth, protocol independence, and lower latency.) In addition, the hub interface may also improve the scalability of a computer system (e.g., upgrading from a base desktop platform to high-end desktop platforms or workstation platform) by providing a backbone for I/O building blocks.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 6:
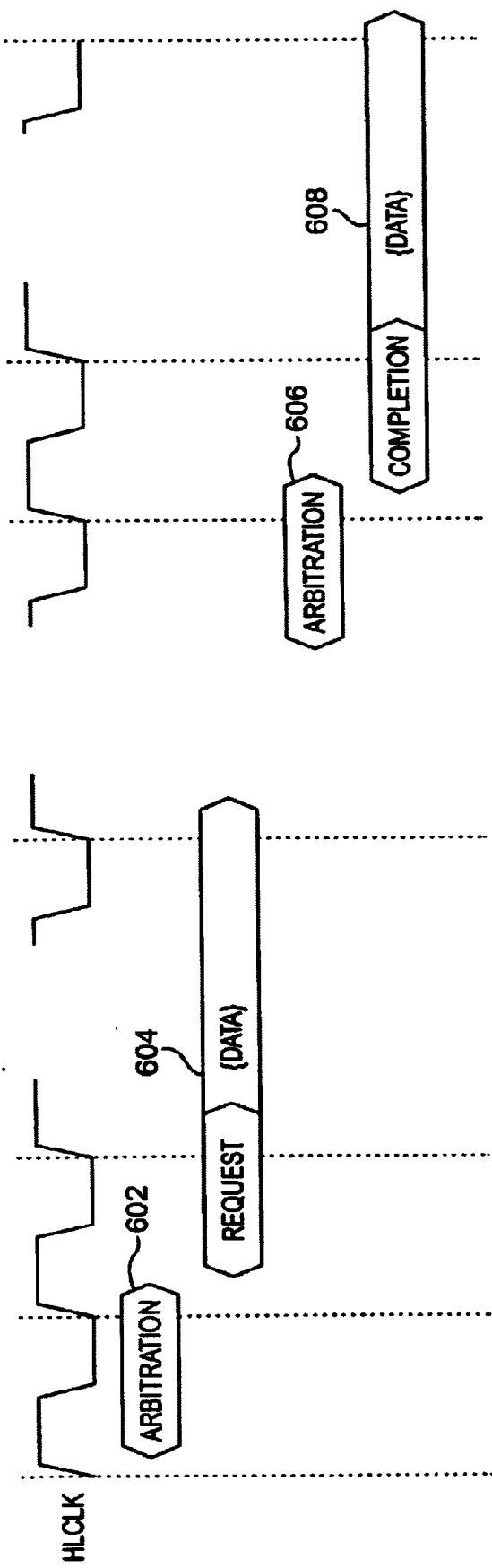
FIG. 6 is a timing diagram illustrating a split transaction implemented by one embodiment of an interface.

FIG. 6 illustrates an example of a split transaction across the hub interface. As illustrated in FIG. 6, a hub agent initially obtains ownership of the hub interface via arbitration 602. Following the arbitration, there is a request phase 604. If necessary (e.g., in the case of returning data for a read transaction), a completion phase 608 will follow the request phase. Prior to the completion phase, however, the responding hub agent, will first arbitrate 606 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the MCH 110, may be transmitted to the ICH 140.

Furthermore, as shown in FIG. 6, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the present invention.

TRANSACTION, PROTOCOL AND PHYSICAL LAYERS

For greater clarity, the hub interface is described in three parts: a transaction layer; a protocol layer; and a physical layer. The distinctions between layers, however, is to be regarded in an illustrative rather than a restrictive sense, and is therefore does not to imply a particular preferred embodiment.

TRANSACTION LAYER

In one embodiment of the hub interface, the transaction layer supports the routing of separate transactions transmitted across the hub interface (which may consist of one or more packets.) For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

Table 1 Routing Field of Transaction Descriptor

| 5 | 4 | 3 | 2 | 1 | 0 |
|---|---|---|---|---|---|
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a MCH). For instance, computer system 100 may have only one hub interface hierarchy. FIG. 1, however, illustrates an example of computer system 100 based on multiple hub interface hierarchies. In embodiments implementing only a one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host controller traffic and Bus Mastering ID (BM-ID) traffic via separate "pipes." As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses. Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub interface. For example, in one embodiment, transactions with identical transaction descriptors are executed in strong order (i.e., first come-first serve.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

PROTOCOL LAYER

In one embodiment, the hub interface uses a packet-based protocol with two types of packets: request and completion. A request packet is used for each hub interface transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No Grant signal is used, and agents determine ownership of the interface independently.

Moreover, in one embodiment, no explicit framing signal is used. There is an implied relationship between the arbitration event that gives an agent ownership of the interface and the start of that agent's transmission. In alternatives embodiment, framing signals could be used without departing from the scope of the invention.

The end of a packet transmission occurs when a hub interface agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub interface, data is transferred at a multiple rate (e.g., 1x, 4x, 8x) of the hub interface clock (HLCK), which in one embodiment is a common clock shared by the hub agents joined by the hub interface. The data is transmitted across a data signal path. (PD) of the hub interface, which has an "interface width" of some power of two (e.g., 8, 16, 24, 32.) As a result, the hub interface may have varying data transfer granularities (i.e., transfer widths), depending upon the transfer rate and the width of the data signal path. For example, in the case of an eight-bit interface width in 4x mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4xmode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

TABLE 2

Byte Transmission Order for 8 and 16 Bit Interface Widths

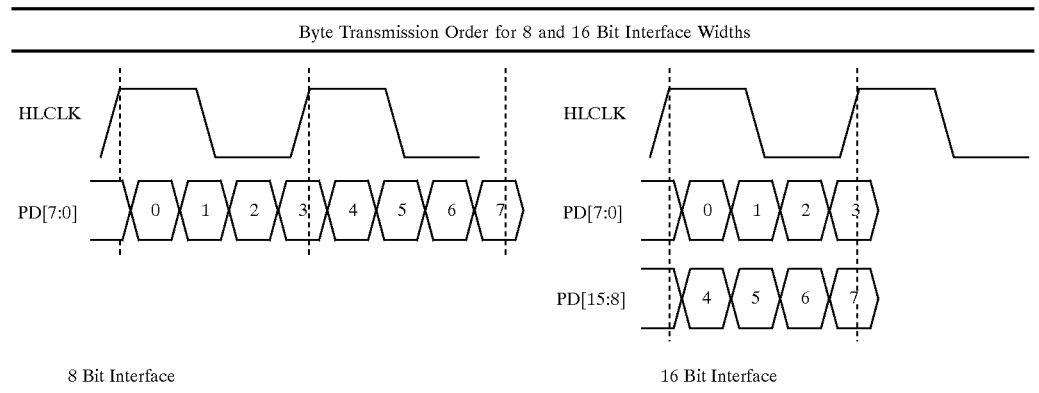

8 Bit Interface                   16 Bit Interface

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are implemented: a header section of a packet starts on the first byte of a transfer width; a data section of a packet (if present) starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

TABLE 3

Request using 32 Bit Addressing and Containing Three Double-words of Data

| 4th Byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (32b) | | | | Request Header | | | |
| Second DW of Data | | | | First DW of Data | | | |
| {Bogus DW} | | | | Third DW of Data | | | |

TABLE 4

Request using 64 Bit Addressing and Containing Three Double-words of Data

| 4th Byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (31:2) | | | | Request Header | | | |
| {Bogus DW} | | | | Address (63:32) | | | |
| Second DW of Data | | | | First DW of Data | | | |
| {Bogus DW} | | | | Third DW of Data | | | |

Request Packets

The packet header format for request packets, according to one embodiment, is shown below in Table 5 and Table 6. In the examples shown in Tables 5 and 6, the base header is one double-word, with one additional double-word required for 32 bit addressing, and two additional double-words required for the 64 bit addressing mode.

The fields of the headers, as shown in Tables 5 & 6 are described below the tables.

In alternative embodiments of the hub interface, the fields included in the header of the request packet may vary without departing from the scope of the invention. For example, the header may include additional field, less fields, or different fields in place of the fields shown below. Moreover, the encoding of the fields may also vary without departing from the scope of the invention.

TABLE 5

Request Packet Header Format for 32 bit Addressing

Last Byte Transmitted ... First Byte Transmitted
31 30 29 28 27 26 25 24 | 23 22 21 20 19 18 17 16 | 15 14 13 12 11 10 9 8 | 7 6 5 4 3 2 1 0

| rq cp | r/w | cr | af | lk | Transaction Desc. Routing Field | Reserved | TD Attr | Space | Data Length (DW) | Last DW BE | 1st DW BE | } Base |
| Addr[31:2] | | | | | | | | | | R | ea / ct | } Address |

TABLE 6

Request Packet Header Format for 64 bit Addressing

Last Byte Transmitted ... First Byte Transmitted
31 30 29 28 27 26 25 24 | 23 22 21 20 19 18 17 16 | 15 14 13 12 11 10 9 8 | 7 6 5 4 3 2 1 0

| rq cp | r/w | cr | af | lk | Transaction Desc. Routing Field | Reserved | TD Attr | Space | Data Length (DW) | Last DW BE | 1st DW BE | } Base |
| Addr[31:2] | | | | | | | | | | R | ea | } 32 bit component |
| Addr[63:32] | | | | | | | | | | | | } 64 bit component |

TABLE 6-continued

Request Packet Header Format for 64 bit Addressing

| | |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO ("01"). |
| 1st DW BE | Byte enables for the first double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

Completion Packets

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

TABLE 7

Completion Packet Header Format

| Last Byte Transmitted | | | | | | | | | First Byte Transmitted |
|---|---|---|---|---|---|---|---|---|---|
| 31 30 29 28 27 26 25 24 | 23 22 21 20 19 18 17 16 | 15 14 13 12 11 10 9 8 | 7 6 5 4 3 2 1 0 | | | | | | |

| rq/cp | r/w | Reserved | lk | Transaction Desc. Routing Field | Reserved | TD Attr | Rsvd | Data Length (DW) | Completion Status |
|---|---|---|---|---|---|---|---|---|---|

| | |
|---|---|
| Transaction Descriptor | The Transaction Descriptor Routing and Attribute fields as previously discussed in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |

TABLE 7-continued

Completion Packet Header Format

| | |
|---|---|
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. |

In one embodiment of hub interface, completions for memory reads may provide less than the full amount of data requested so long as the entire request is eventually completed. Likewise, completions for memory writes may indicate that less than the entire request has been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with the corresponding request. In the case of multiple completions, the initiator accumulates a count of the data completed for the original request until the original request is fully completed.

Interface Arbitration and Packet Framing

In one embodiment of the hub interface interface, when the interface is idle, the assertion of a request from either hub agent connected to the interface is considered an arbitration event. The first agent to request wins ownership of the interface. If agents request ownership simultaneously when the hub interface is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslice value may be programmed via a hub interface command register for each interface in each hub agent.

Figure 7:
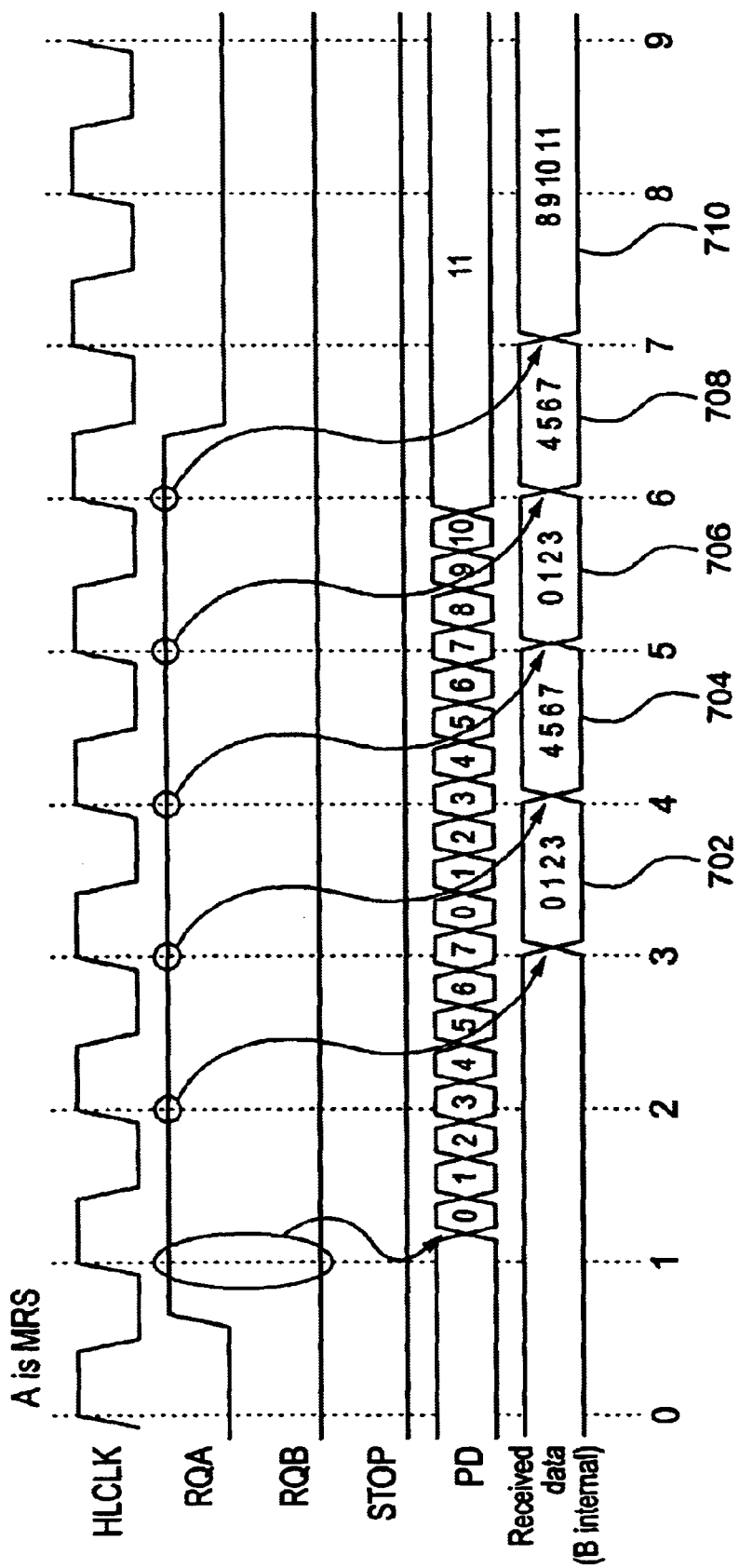
FIG. 7 is a timing diagram illustrating arbitration and transmission of data packets, according to one embodiment.

FIG. 7 illustrates an example of arbitration for the hub interface between hub agent A and agent B and the transfer of two packets. The example illustrates arbitration out of an idle interface state, with the interface then returning to idle. Moreover, in the example illustrated, the interface is using a 4× data transfer mode with eight bit data signal (PD) path. Agent A, in the example illustrated in FIG. 7, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 702 and 704 and requires two base clocks to transmit in the 4×mode. The second packet is three double-words 706, 708, and 710, and so requires three base clocks in the 4× mode.

Flow Control

In one embodiment, packets may be retried or disconnected by a receiving agent due to lack of request queue space, data buffer space, or for other reasons. In one embodiment, Flow control is accomplished using a STOP signal.

Figure 8:
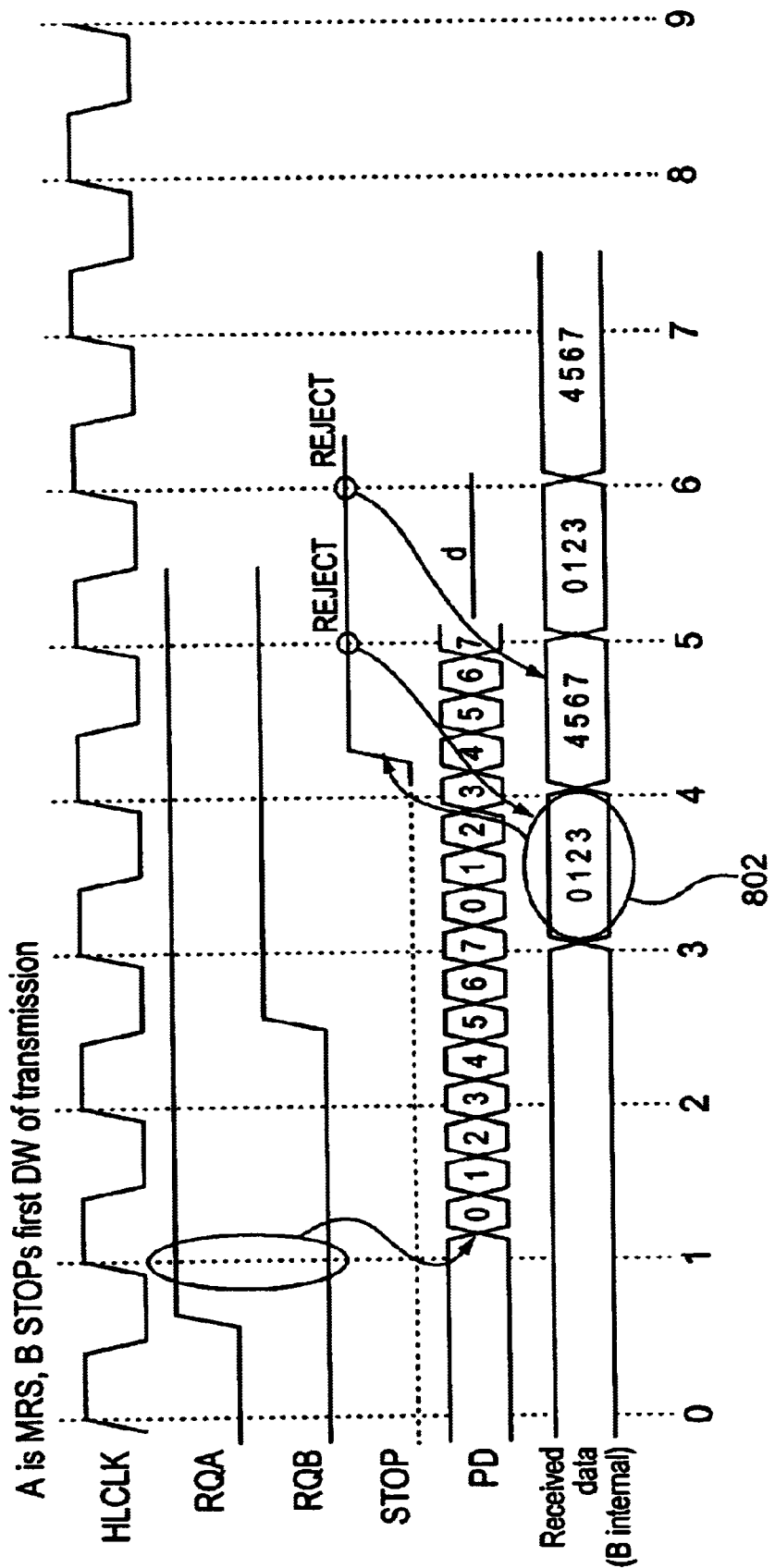
FIG. 8 is a timing diagram illustrating flow control of data packets, according to one embodiment.

FIG. 8 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 8, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4× mode (using an eight bit wide PD signal), the STOP signal is sampled each base clock. However, for a 1× mode, the STOP signal is sampled each fourth clock (with the beginning of a transaction being used as a reference point).

Figure 9:
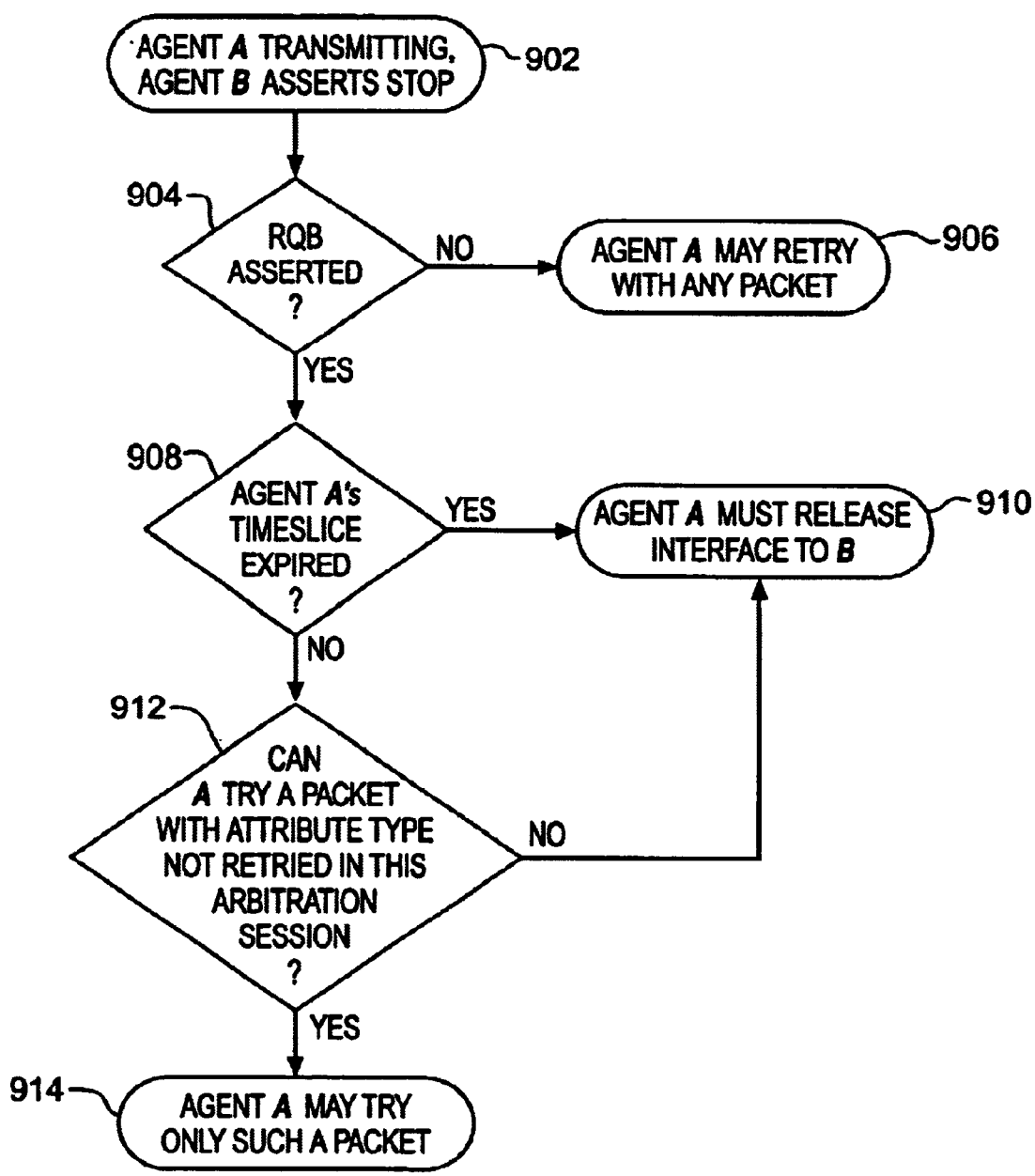
FIG. 9 illustrates a flow diagram describing the steps of responding to flow control operations according to one embodiment.

Following the reception of a STOP signal, the hub agent that receives the STOP signal determines whether it may retry sending additional packets. FIG. 9 is a flow diagram describing the steps performed by a hub agent in determining whether it may retry sending a packet following receipt of a STOP signal, according to one embodiment.

In step 902, a hub agent that is currently transmitting packets receives a STOP signal. In response, in step 904 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 906 the current owner of the interface may attempt to transmit a packet following recovery from the STOP. On the other hand, if it is determined that the agent which activated the STOP signal is requesting ownership, in step 908, the current owner determines if its timeslice has expired.

If the timeslice for the current owner of the interface has expired, in step 910, the current owner releases ownership. If the timeslice for the current owner has not expired, the current owner may transmit a packet with an attribute that is different from the interrupted packet. More specifically, in step 912, the current owner determines if it has a packet with a attribute type that is different from any packets that have been retried in the present arbitration session (i.e., the period of the current owner's tenure), which needs to be transmitted.

If the current owner does have a packet with a different attribute, in step 914 the current owner may attempt to transmit the packet. Otherwise, the current owner release ownership of the interface.

PHYSICAL INTERFACE

In one embodiment, the hub interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

Figure 10:
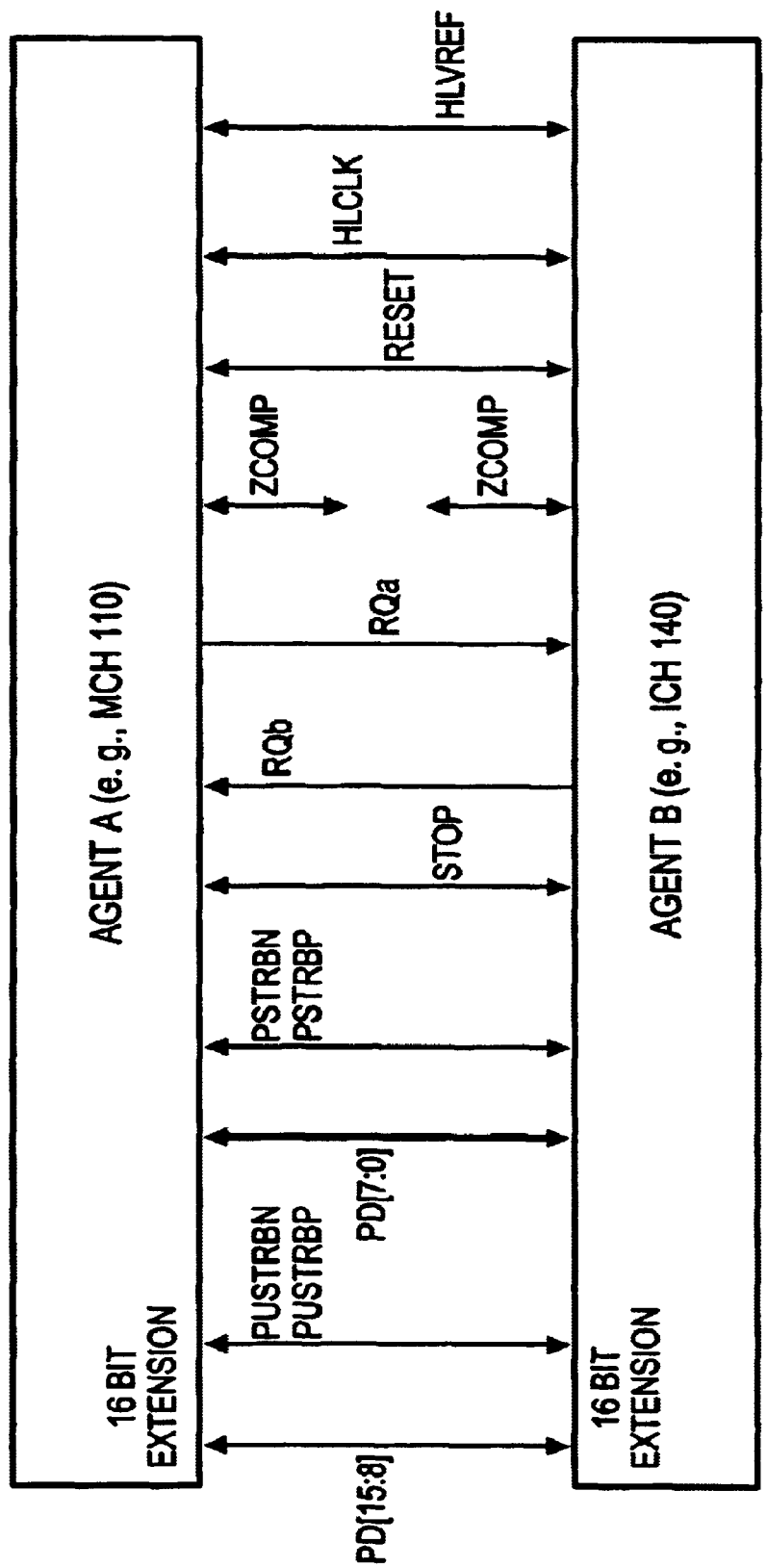
FIG. 10 illustrates the physical signal interface according to one embodiment.

External Signals Definition FIG. 10 illustrates the physical signal interface of the hub interface between two hub agents, according to one embodiment. As shown in FIG. 10, the hub interface physical interface uses a bi-directional eight bit data bus (PD [7:0]) with a differential pair of source synchronous strobe signals (PSTRBN, PSTRBP) for data clocking. In an alternative embodiment, the interface can widened. For example, as shown in FIG. 10, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQA, RQB), and a bi-directional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations are also included.

The physical signals shown in the interface illustrated in FIG. 10 are further described below in Table 8. In alternative embodiments of the hub interface, the signals included in the physical interface may vary without departing from the scope of the invention. For example, the physical interface may include more, less or different signals varying from the signals shown in FIG. 10 and further described below in Table 8.

TABLE 8

Hub Interface Signals for Eight Bit Agents

| Name | Bits (Pads) | Type | Clock Mode | Description |
|---|---|---|---|---|
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above. |
| RQB | 1 | I/O | CC[3] | Active-high request from agent A (output from A, input to B) to obtain ownership of the hub interface interface. RQA is asserted when agent A has data available to send, and is deasserted when either all of agent A's data has been sent or agent A determines that it should release the interface. Reset voltage value is VSSHL. |
| RQA | 1 | I/O | CC | Request from agent B (output from B, input to A). See above description of RQA. |
| STOP | 1 | ASTS | CC | Used for pipelined flow control to retry or disconnect packets. |
| HLCLK | 1 | I | N/A | hub interface base clock, in one embodiment, either 66 MHz or 100 MHz. This provides timing information for the common clock signals (described further below. |
| RESET# | 1 | I | CC | Active-low reset indication to hub interface agents.[4] |
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock.) In alternative embodiments, the signals may be tied to a system clock, exterior to the hub interface agents. Moreover, there may be more than one hub interface segment in a system, in which case different base clocks may be used for the different segments. For example, one component might implement both a 66 MHz base hub interface and a 100 MHz base hub interface.

Source Synchronous Transfer Mode Operation In one embodiment, the packets/data are transmitted using a source synchronous clock mode, which provides a technique for multiplying the data transfer rate of data. For example, in an embodiment using 4X source synchronous clocking mode with an eight bit data signal path, transmitting a double-word (i.e., four byte) requires only one hub interface clock cycle (HLCK.) Alternatively, transmitting a double word using 1× source synchronous clocking mode on an eight bit data signal path would require a full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 11, in one embodiment a first data transfer corresponds to the rising edge of PSTRBP and the falling edge of PSTRBN. A second data transfer corresponds to the rising edge of PSTRBN and the falling edge of PSTRBP.

Figure 11:
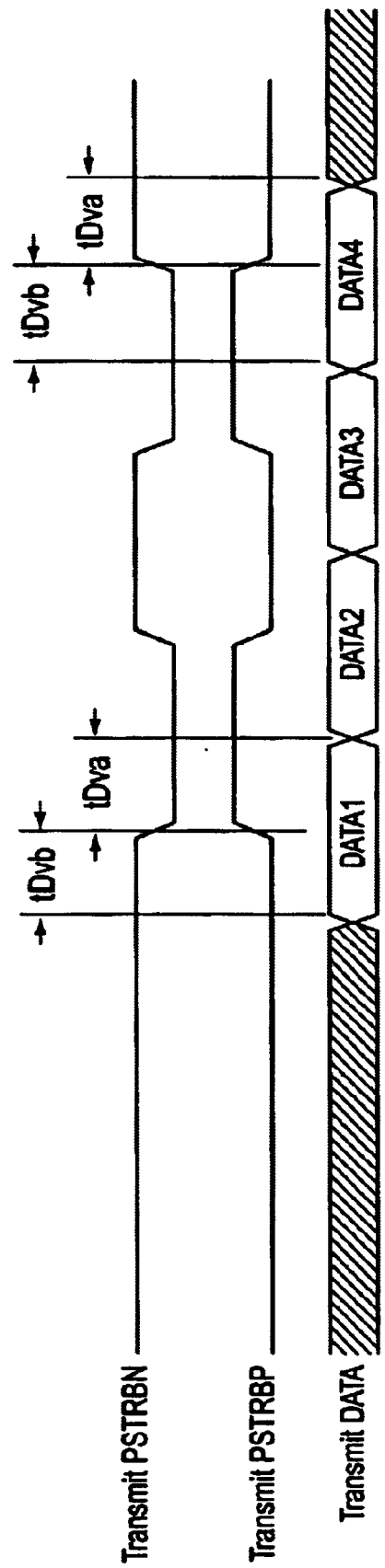
FIG. 11 is a timing diagram illustrating source synchronous clocking according to one embodiment.

In addition, in one embodiment, as further shown in FIG. 11, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge. (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
a first hub agent;
a first interface, coupled to the first hub agent, that comprises:
a data signal path to transmit data in packets via split transactions; and
a set of command signals, the first interface providing a point-to-point connection exclusive of an external bus connected directly to the first interface; and
a second hub agent coupled to the first interface, that exchanges data clocking rate capabilities with the first hub agent via the first interface to establish a first data clocking rate.

2. The computer system of claim 1 wherein the first hub agent includes a first interface controller coupled to the interface to exchange data clocking rate capabilities with the second hub agent.

3. The computer system of claim 2 wherein the first interface controller comprises:
a first register that stores a value representing the highest data clocking rate supported by the first hub agent; and
a first control circuit that receives a second value corresponding with a second data clocking rate and determines the data clocking rate for operating the hub agent by comparing the first and second values.

4. The computer system of claim 3 wherein the second hub agent includes a second interface controller coupled to the interface to exchange data clocking rate capabilities with the first hub agent.

5. The computer system of claims 4 wherein the second interface controller comprises:
a second register that stores a value representing the highest data clocking rate supported by the second hub agent; and
a second control circuit.

6. The computer system of claim 1 further comprising:
a second interface coupled to the second hub agent; and
a third hub agent coupled to the second interface.

7. The computer system of claim 6 wherein the first hub agent is a memory controller hub (MCH), the second hub agent is an input/output control hub (ICH) and the third hub agent is a network interface.

8. The computer system of claim 1 further comprising:
a second interface coupled to the first hub agent; and
a third hub agent coupled to the second interface.

9. The computer system of claim 8 further comprising a central processing unit (CPU) coupled to the first hub agent.

10. A computer system comprising:
a memory controller hub (MCH); and
a first interface coupled to the MCH to transfer data directly between the MCH and a first hub agent within the computer system, the first interface comprising:
a data signal path to transmit data in packets via split transactions; and
a set of command signals, the first interface providing a point-to-point connection between the MCH and the first hub agent, exclusive of an external bus connected directly to the first interface;
the MCH operable to exchange data clocking rate capabilities with the first hub agent via the first interface to establish a first data clocking rate.

11. The computer system of claim 10 wherein the MCH includes a first interface controller coupled to the interface to exchange data clocking rate capabilities with the first hub agent.

12. The computer system of claim 11 wherein the first interface controller comprises:
a first register that stores a value representing the highest data clocking rate supported by the MCH; and
a first control circuit that receives a second value corresponding with a second data clocking rate and determines the data clocking rate for operating the hub agent by comparing the first and second values.

13. The computer system of claim 12 wherein the first hub agent includes a second interface controller coupled to the interface to exchange data clocking rate capabilities with the MCH.

14. The computer system of claim 13 wherein the second interface controller comprises:
   a second register that stores a value representing the highest data clocking rate supported by the first hub agent; and
   a second control circuit.

15. The computer system of claim 10 further comprising:
   a second interface coupled to the MCH; and
   a second hub agent coupled to the second interface.

16. The computer system of claim 15 wherein the first hub agent is a network interface card and the second hub agent is a graphics accelerator.

17. The computer system of claim 10 further comprising a central processing unit (CPU) coupled to the MCH.

18. The computer system of claim 17 wherein the MCH further comprises:
   a memory controller coupled to the CPU; and
   a graphics interface.

19. The computer system of claim 10 further comprising:
   an interface control hub (ICH) coupled to the MCH;
   a second interface coupled to the ICH; and
   a second hub agent coupled to the second interface.

20. The computer system of claim 19 wherein the ICH further includes a peripheral component interface (PCI) bridge coupled to a PCI bus.

21. A hub agent comprising an interface controller that coupled to an interface to exchange data clocking rate capabilities with a device coupled to the interface, the interface comprising:
   a data signal path to transmit data in packets via split transactions; and
   a set of command signals, the interface providing a point-to-point connection between the first hub agent and the device, exclusive of an external bus connected directly to the interface.

22. The hub agent of claim 21 wherein the interface controller comprises:
   a register for storing a first value corresponding with a first data clocking rate of the hub agent; and
   a control circuit for receiving a second value corresponding with a second data clocking rate, wherein the control circuit determines the data clocking rate for operating the hub agent by comparing the first and second values.

* * * * *

UNITED STATES PATENT AND TRADEMARK OFFICE
CERTIFICATE OF CORRECTION

PATENT NO. : 6,636,912 B2
DATED : October 21, 2003
INVENTOR(S) : Ajanovic et al.

It is certified that error appears in the above-identified patent and that said Letters Patent is hereby corrected as shown below:

Column 3,
Line 42, delete "10" and insert -- 110 --.

Column 11,
Line 46, delete "alternatives" and insert -- alternative --.

Column 19,
Line 6, before the word "current", delete ",".

Signed and Sealed this

Thirteenth Day of January, 2004

JON W. DUDAS
*Acting Director of the United States Patent and Trademark Office*